(12) United States Patent
Supiot

(10) Patent No.: US 11,197,424 B2
(45) Date of Patent: Dec. 14, 2021

(54) SORTING TABLE FOR A FRUIT HARVESTER

(71) Applicant: CNH Industrial America LLC, New Holland, PA (US)

(72) Inventor: Guillaume Supiot, Dompierre-sur-Yon (FR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/286,814

(22) PCT Filed: Oct. 17, 2019

(86) PCT No.: PCT/EP2019/078267
§ 371 (c)(1),
(2) Date: Apr. 19, 2021

(87) PCT Pub. No.: WO2020/079180
PCT Pub. Date: Apr. 23, 2020

(65) Prior Publication Data
US 2021/0307250 A1    Oct. 7, 2021

(30) Foreign Application Priority Data
Oct. 17, 2018    (EP) ..................................... 18315033

(51) Int. Cl.
*A01D 46/28*    (2006.01)
*B07B 1/15*    (2006.01)
*B07B 1/46*    (2006.01)

(52) U.S. Cl.
CPC .............. *A01D 46/285* (2013.01); *B07B 1/15* (2013.01); *B07B 1/4636* (2013.01)

(58) Field of Classification Search
CPC ............ B07B 1/14; B07B 1/15; B07B 1/4636
See application file for complete search history.

(56) References Cited

U.S. PATENT DOCUMENTS

| | | | | |
|---|---|---|---|---|
| 2,778,296 A | * | 1/1957 | De Koning | ............. B41F 17/26 |
| | | | | 101/5 |
| 6,098,811 A | * | 8/2000 | Schaefer | ................... B07B 1/50 |
| | | | | 209/395 |

(Continued)

FOREIGN PATENT DOCUMENTS

| | | |
|---|---|---|
| AU | 468224 B2 | 12/1975 |
| EP | 1002467 A1 | 5/2000 |

(Continued)

OTHER PUBLICATIONS

International Search Report and Written Opinion for PCT Application No. PCT/EP2019/078267 dated Jan. 30, 2020 (12 pages).

(Continued)

*Primary Examiner* — Terrell H Matthews
(74) *Attorney, Agent, or Firm* — Peter Zacharias; Patrick Sheldrake

(57) ABSTRACT

A sorting table for sorting fruit includes a frame with a first side member and a second side member, a plurality of conveying rollers carried by the frame, a plurality of sorting rollers carried by the frame and positioned downstream from the conveying rollers, and a pair of combs positioned respectively with the first side member or the second side member. Each comb includes slots associated with a respective one of the sorting rollers. Each of the combs is pivotally coupled with a corresponding one of the first side member or the second side member. An actuator is coupled with each of the combs for selectively moving the pair of combs in directions transverse to the crop flow direction. An electrical processing circuit coupled with the actuator is configured for controlling the actuator and thereby selectively increasing or decreasing a spacing between the sorting rollers.

15 Claims, 7 Drawing Sheets

(56) References Cited

U.S. PATENT DOCUMENTS

| | | |
|---|---|---|
| 8,984,852 B2 | 3/2015 | Ferrandez |
| 9,265,279 B2 * | 2/2016 | Le Neve ................ A23N 15/02 |
| 2012/0131894 A1 | 5/2012 | Pellenc et al. |
| 2016/0242457 A1 * | 8/2016 | Minnicucci ........... B07B 1/4636 |

FOREIGN PATENT DOCUMENTS

| | | | |
|---|---|---|---|
| EP | 3006120 A1 * | 4/2016 | .............. B07B 1/14 |
| EP | 3058834 A1 | 8/2016 | |
| EP | 3006120 B1 | 3/2017 | |
| FR | 2840919 A1 | 12/2003 | |
| FR | 2944978 A1 | 11/2010 | |
| GB | 1101932 A | 2/1968 | |
| WO | 2010/12936 A2 | 2/2010 | |
| WO | 2012/150354 A1 | 11/2012 | |

OTHER PUBLICATIONS

Extended European Search Report for European Application No. 18315033.3 dated Apr. 25, 2019 (5 pages).

* cited by examiner

SORTING TABLE FOR A FRUIT HARVESTER

BACKGROUND OF THE INVENTION

The present invention relates to a harvester for harvesting fruit, such as grapes and other berries, and, more specifically to sorting arrangements used in such harvesters.

A fruit harvester in the form of a self-propelled grape harvester includes a chassis which carries an onboard power plant and several onboard sub-systems for processing the grapes. The grape harvester straddles and traverses along at least one row of grape vines, and a picking system separates the grapes and Material Other than Grapes (referred to as "MOG", such as leaves, stems, wood debris, etc.) from the vines. The picking system typically is in the form of "pivotal strikers" or "trunk shakers". The pivotal strikers can include a double bank of flexible horizontal rods that strike and shake the vine to remove the fruit. The trunk shakers can include parallel skiis oriented on edge that move from side to side to impart horizontal vibration to the vines for removal of the grapes and MOG.

A conveying system transports the grapes and MOG to a cleaning system, which in turn separates the grapes from the MOG and cleans the crop. The cleaning system can include one or more cleaning fans, a sorting table, and a destemmer. The one or more cleaning fans can be positioned upstream in the cleaning system, and remove larger MOG, such as leaves, from the stream of crop material by suction and discharge the larger MOG, such as behind the harvester. The sorting table can include a combination of conveying rollers and sorting rollers, which can be optimized for different sizes of grapes. The grapes which are dropped on the conveying rollers are transported to the sorting rollers, where the grapes are sorted from the MOG. The sorting rollers can be configured with an adjustable gap between the sorting rollers such that the grapes fall through and the MOG is transported to the end of the sorting table and discharged. The rollers may also receive grapes in bunches and convey these rearwardly to a destemmer. The destemmer removes the central stalk or stems from the grapes, which are received below the destemmer. The central stalk is ejected at the end of the destemmer.

PCT publication WO2012/150354 (equivalent U.S. Pat. No. 9,265,279), discloses a sorting table that can be used in a grape harvester. For example, the Braud 9090X grape harvester, which is sold by the assignee of the present invention, can utilize such a sorting table. The sorting table includes a frame carrying a plurality of sorting rollers positioned downstream from a plurality of conveying rollers. Grape bunches and loose grapes including MOG are deposited on the conveying rollers and the MOG is sorted from the loose grapes using the sorting rollers.

EP 3006120 B1 discloses a stationary sorting table which can be used in the winery for sorting grapes from MOG after the harvest, which is required when the grape harvester itself was not provided with an effective sorting system. The spacing between the downstream sorting rollers can be manually adjusted using a manual crank or handle (FIG. 1B) which selectively raises and lowers a pair of combs positioned along the sides of the sorting table. Each comb has a number of slots formed between adjacent teeth, and each sorting roller is associated with a respective pair of slots in the opposite combs. The slots extend at increasing angles from the front to the rear end of the sorting table. The combs are spring biased relative to the sorting rollers, and a cam arrangement can be manually adjusted to overcome the spring bias. Manually raising and lowering the combs in turn increases or decreases the spacing between adjacent rows of sorting rollers.

SUMMARY OF THE INVENTION

The invention in one form is directed to a sorting table for sorting fruit in a fruit harvester. The sorting table includes a frame with a first side member and a second side member, a plurality of conveying rollers carried by the frame, a plurality of sorting rollers carried by the frame and positioned downstream from the conveying rollers, and a pair of combs positioned in association with the first side member or the second side member. Each comb includes a plurality of slots with each of the slots being associated with a respective one of the plurality of sorting rollers. The sorting table is characterized in that each of the combs is pivotally coupled with the corresponding first side member or the second side member. An actuator is coupled with each of the combs for selectively moving the pair of combs in directions transverse to the crop flow direction. An electrical processing circuit coupled with the actuator is configured for controlling the actuator and thereby selectively increasing or decreasing a spacing between the sorting rollers.

In another form of the invention, the plurality of slots have distinct rearward inclinations, with the rearward inclinations decreasing for slots closer to the pivot point of the combs.

In another form of the invention, the plurality of sorting rollers has an upstream end that is positioned adjacent to a downstream end of the plurality of conveying rollers, and the upstream end of the sorting rollers is connected to the downstream end of the conveying rollers and maintained by this connection at a fixed distance therefrom.

In another form of the invention, an upstream sorting roller positioned at the upstream end of the plurality of sorting rollers is mechanically connected with a downstream conveying roller positioned at a downstream end of the plurality of conveying rollers, thereby maintaining a substantially constant spacing between the upstream sorting roller and the downstream conveying roller.

In another form of the invention, the upstream sorting roller is connected to the downstream conveying roller by a pair of mechanical links, each of the links being positioned at and connected with a respective opposite end of the upstream sorting roller and the downstream conveying roller.

In another form of the invention, the conveying rollers are carried by guide surfaces provided on the first and second side frame members, allowing for the movement of the conveying rollers in a fore-and-aft direction with respect to the frame.

In another form of the invention, a distance member maintains the spacing between the conveying rollers during the fore-and-aft movement.

In another form of the invention, the distance member includes at least one front comb positioned in association with the first side member or the second side member. Each comb includes a plurality of slots with each of the slots being associated with a respective one of the plurality of conveying rollers.

The invention in another form includes an elongate member connected at opposite ends with a respective one of the combs. The actuator is coupled with the elongate member to simultaneously move the pair of combs in the selected transverse direction.

In another form of the invention, the actuator comprises a powered ram connected with the elongate member, and the electrical processing circuit is configured to selectively extend and retract the ram to thereby simultaneously move the pair of combs in the selected transverse direction.

In another form of the invention, a lever arm is connected with and extends from the elongate member. The lever arm is pivotable about an axis of the elongate member, and the ram of the actuator is connected with the lever arm to pivot and thereby simultaneously move the pair of combs in the selected transverse direction.

In yet another form of the invention, a pair of swing arms are connected with and extend from the elongate member. Each of the swing arms engage a corresponding one of the combs.

In yet another form of the invention, each of the combs comprises a slot, and each of the swing arms comprises a distal end carrying a roller which is positioned within a corresponding one of the slots.

In yet another form of the invention, each of the combs has a trailing end which is pivotally coupled with a corresponding one of the first side member or the second side member.

In yet another form of the invention, a grape harvester comprises a sorting table, according to any of the sub-claims.

In yet another form of the invention, a method of sorting fruit utilizes a sorting table, according to any of the sub-claims.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
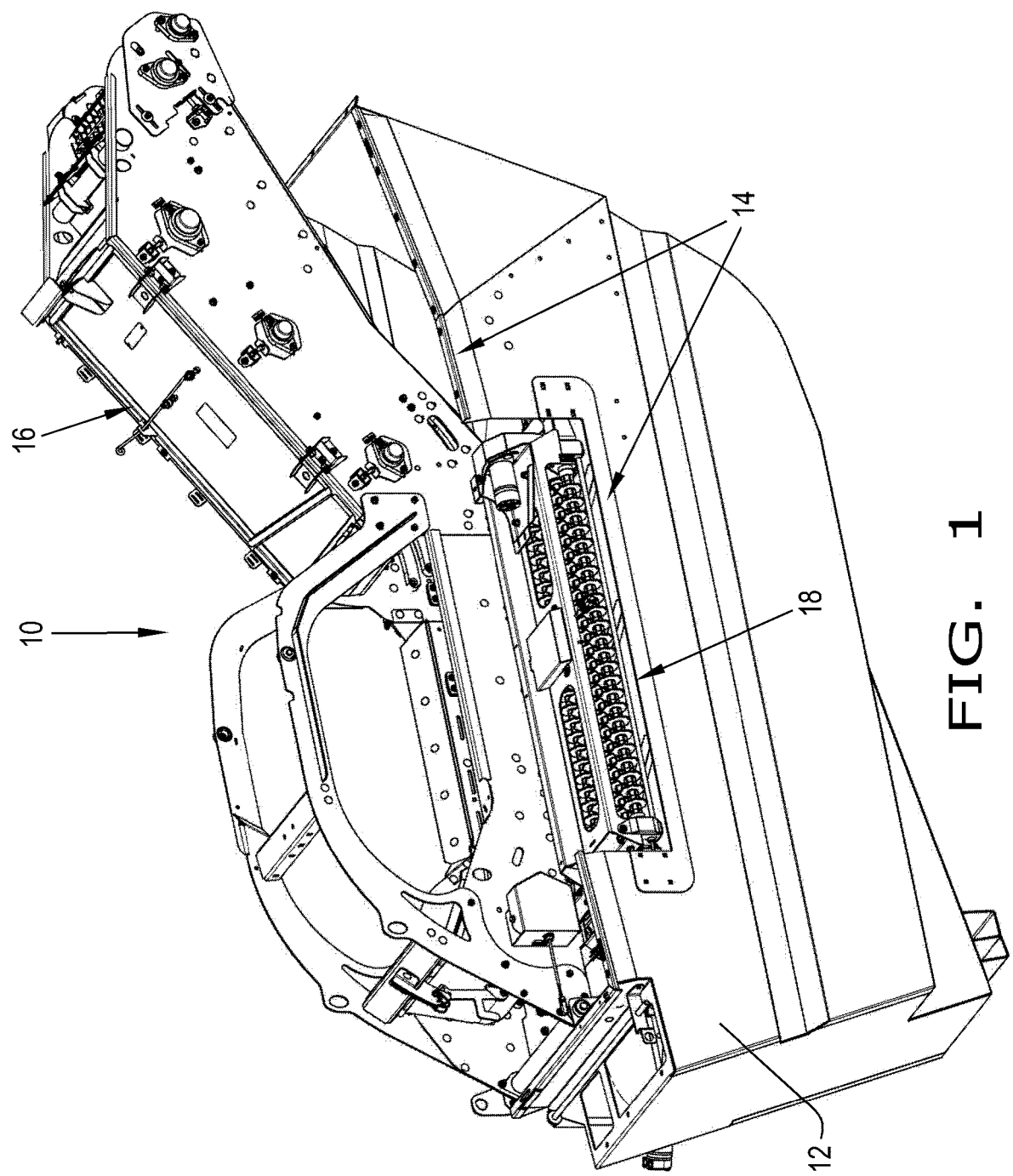
FIG. 1 is a perspective view of a side portion of a fruit harvester which can include a sorting table according to an embodiment of the present invention.
Figure 2:
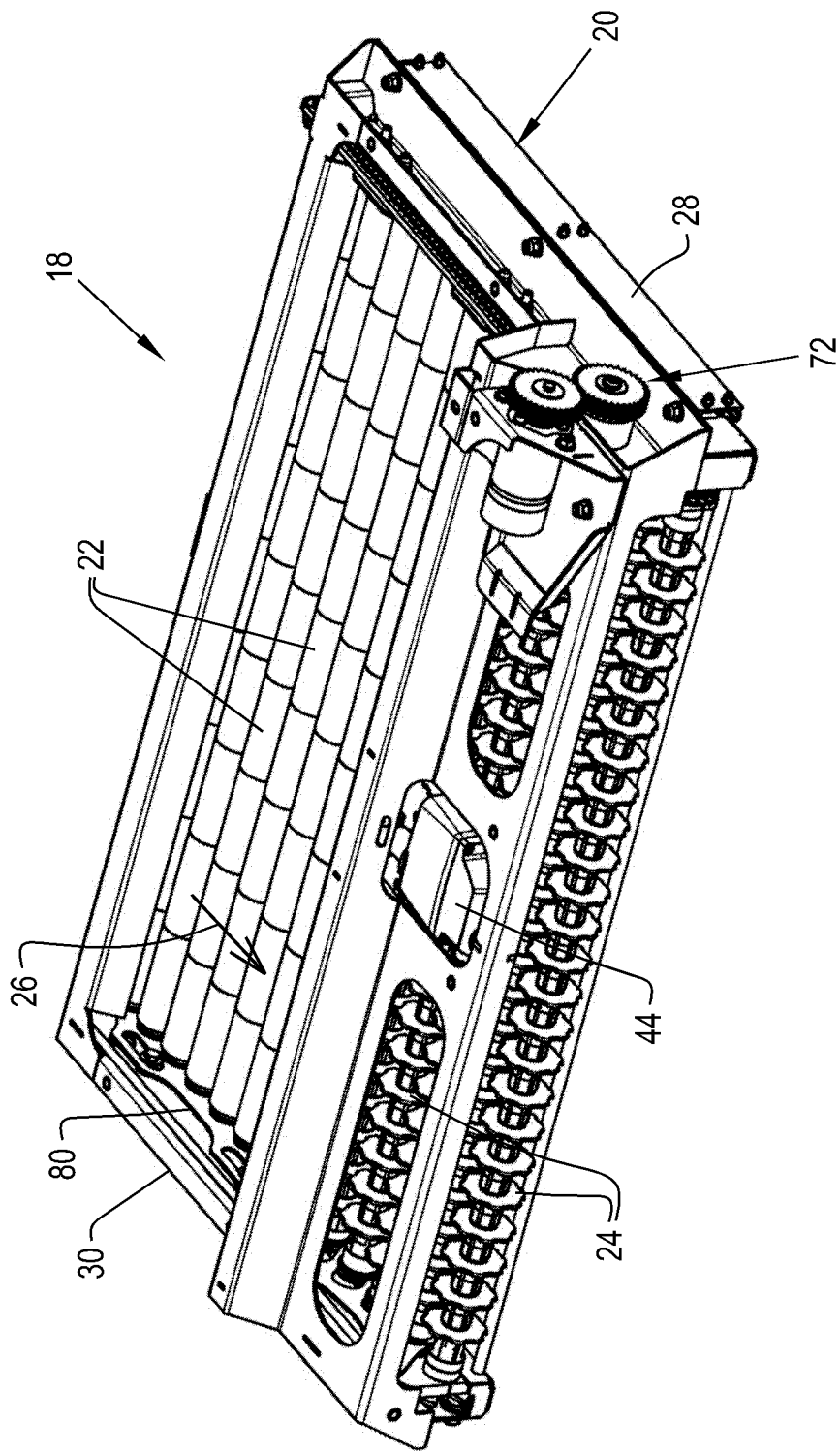
FIG. 2 is a perspective view of an embodiment of a sorting table of the present invention.
Figure 3:
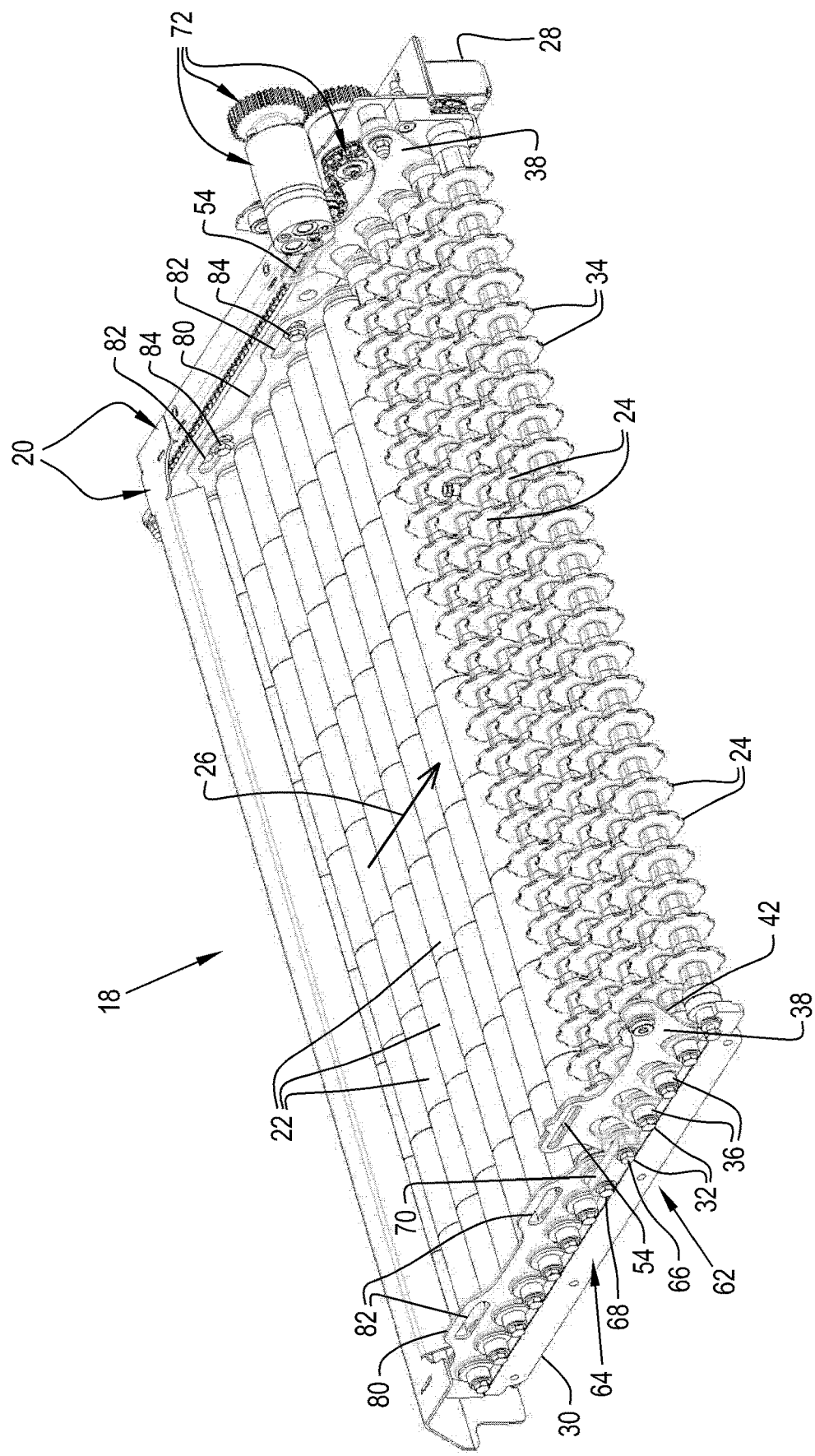
FIG. 3 is another perspective view of the sorting table shown in FIG. 2, with the cover and actuator removed.

Referring now to the drawings, and more particularly to FIG. 1, there is shown a portion of a fruit harvester 10 in the form of a grape harvester. The fruit harvester 10 can be variously configured for different applications. The fruit harvester 10 can include a chassis 12 carrying multiple different sub-systems and components, such as an operator cab and a picking system (not shown in FIG. 1), and a cleaning system 14.

The cleaning system 14 can include a cleaning fan (not shown in FIG. 1), a destemmer 16, and a sorting table 18. The destemmer 16 is used to remove the central stalk or stems from the bunches of grapes. Typically the bunches are received on an endless conveyor having a mesh surface (not shown), which allows the passage of loose grapes to the sorting table 18. The conveyor surface feeds any bunches and MOG greater than the mesh apertures rearwardly and upwardly to a series of transverse rotating shafts. These shafts have plastic radial fingers which pass close to the mesh surface and interact with the bunches to detach the grapes from the central stems. The loosened grapes fall through the mesh surface to the bottom of the destemmer housing, which guides them to the sorting table 18. The stems and the MOG remain on top of the mesh conveyor until they are ejected at the rear end of the destemmer housing.

Referring now to FIGS. 2-8, the sorting table 18 is shown and will be described in greater detail. The sorting table 18 generally includes a frame 20, a plurality of conveying rollers 22, and a plurality of sorting rollers 24. The conveying rollers 24 receive grapes and MOG and transport the grapes and MOG downstream (relative to a crop travel direction 26) to the sorting rollers 24 for sorting the MOG from the grapes. The frame 20 includes a first side member 28 and a second side member 30. The plurality of conveying rollers 22 are carried by the frame 20, more specifically by the respective side frame members 28 and 30. The plurality of sorting rollers 24 are likewise carried by the frame 20, more specifically by the respective side frame members 28 and 30. The surfaces of the conveying rollers 24 may be smooth or profiled, but the clearance between them does not allow for the passage of the loose berries. Each of the sorting rollers 24 includes a central shaft 32 carrying a succession of toothed disks or wheels 34 between cylindrical spacers. However, it is also conceivable to provide the central shaft 32 with another, e.g. wavy profile, resulting in a plurality of passages for the berries between successive sorting rollers. The sorting rollers 24 have bearings 36 at the outboards ends of the central shaft 32. The bearings 36 are mounted on guide surfaces of the side frame members 28, 30, allowing for fore-and-aft movement of the sorting rollers 24 in a horizontal plane, substantially parallel to the side frame members 28, 30.

A pair of combs 38 is positioned at opposite ends of the sorting rollers 24, with one comb 38 being positioned adjacent to the first side member 28 and the other comb 38 being positioned adjacent to the second side member 30. Each comb 38 includes a plurality of slots 40 with each of the slots 40 being associated with a respective one of the plurality of sorting rollers 24. Each of the combs 38 is pivotally coupled with a corresponding first side member 28 or second side member 30. In the illustrated embodiment, each of the combs 38 has a trailing end 42 (relative to the direction of crop travel 26) which is pivotally coupled with a corresponding first side member 28 or second side member 30. However, each comb 38 could be pivotally coupled at a different location, such as the leading end or approximate middle of the comb 38.

An actuator 44 is coupled with each of the combs 38 for selectively moving the pair of combs 38 in directions transverse to the crop flow direction. The actuator 44 can be configured as different types of an actuator, depending on the specific application. For example, the actuator 44 can be configured as a fluid powered cylinder and piston arrangement, or a screw arrangement driven by an electric motor.

In the embodiment shown, the actuator 44 is configured as a powered ram which is connected with a transversely arranged elongate member 46. The elongate member 46 is connected at opposite ends with a respective one of the combs 38, and the actuator 44 is coupled with the elongate member to simultaneously move the pair of combs in the selected transverse direction. To that end, a lever arm 48 can be connected with and extend from the elongate member 46. The lever arm 48 is pivotable about an axis (not numbered) of the elongate member 46, and the ram 44 can be connected with the lever arm 48 to pivot and thereby simultaneously move the pair of combs 38 in the selected transverse direction. A pair of swing arms 50 can be connected with and extend from the outboard ends of the elongate member 46, with each of the swing arms 50 engaging a corresponding one of the combs 38. Each of the swing arms 50 can include a distal end (not numbered) carrying a roller 52 which is positioned within a corresponding slot 54 formed in the combs 38.

Figure 4:
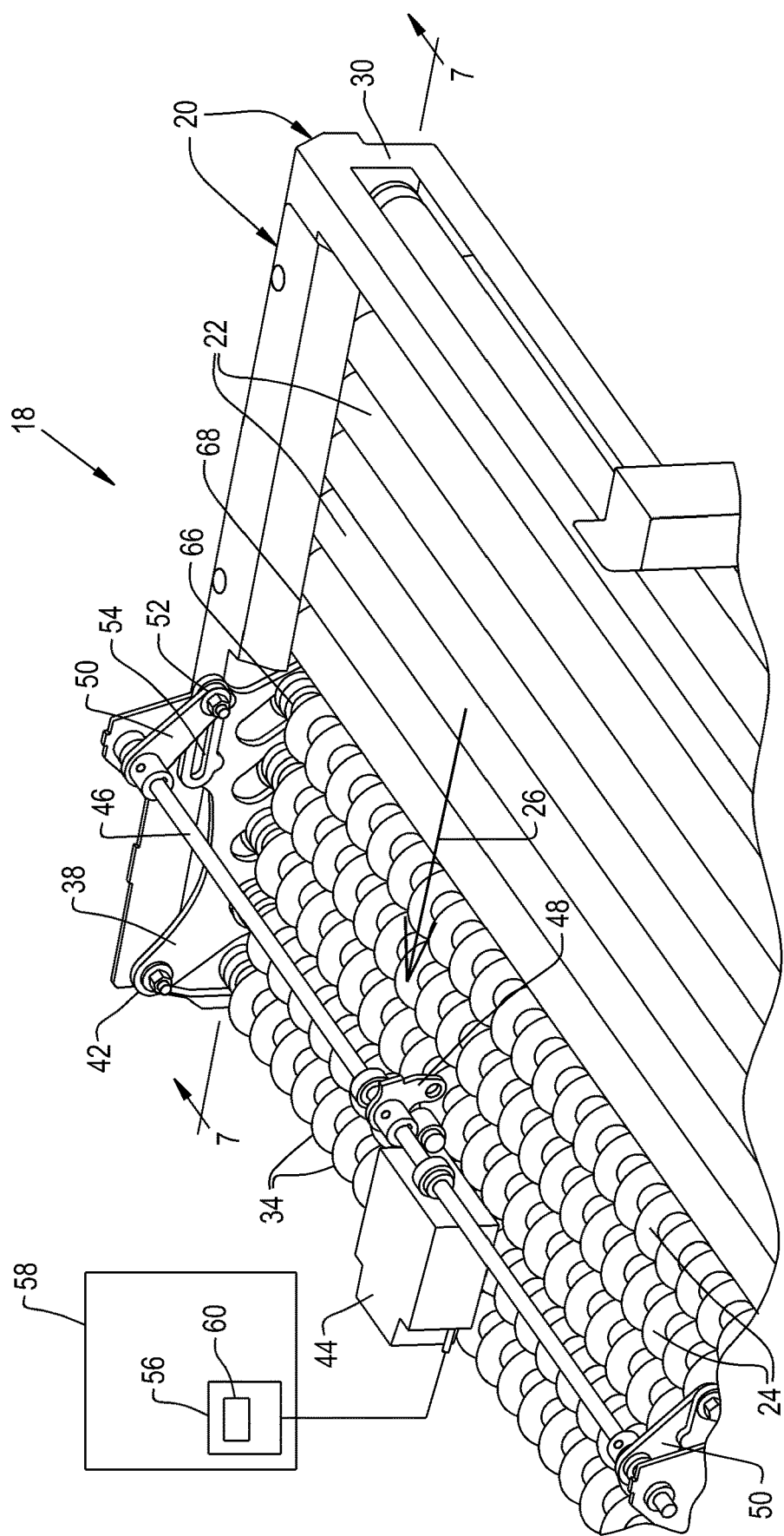
FIG. 4 is a perspective view of a portion of the sorting table shown in FIGS. 2 and 3, with the actuator coupled with an electrical processing circuit.

Referring now more specifically to FIG. 4, an electrical processing circuit 56 can be coupled with the actuator 44, such as by a wired or wireless connection, LAN, etc. The electrical processing circuit 56 can be digital and/or analog, and can be placed at a suitable location on the fruit harvester 10, such as in an operator cab 58. The electrical processing circuit 56 can include any number of discrete components, such as a static and/or dynamic memory 60, input device (not specifically shown, etc.). The electrical processing circuit 56 can be configured for controlling the actuator 44 and thereby selectively increasing or decreasing a spacing between the sorting rollers 24. For example, in the embodiment shown, the electrical processing circuit 56 can be configured to selectively extend and retract the ram of the actuator 44 to thereby simultaneously move the pair of combs 38 in the selected transverse direction. It can be understood by reference to FIGS. 7 and 8 that the slots 40 are not parallel and have a rearward inclination that decreases for slots 40 closer to the pivot point of the combs 38. In the present embodiment the last slot 40 is taking a substantially vertical position. When the combs 38 are moved in a direction away from the sorting rollers 24, then the sections of the slots 40 that hold the roller bearings 36 diverge away from each other and cause the spacing between the sorting rollers 24 to increase. On the other hand, when the combs 38 are moved in a direction toward the sorting rollers 24, then the sections of the slots 40 holding the bearings 36 converge toward each other and the spacing between the sorting rollers 24 decreases.

According to another aspect of the present invention, the sorting table 18 is configured such that the spacing between the last conveying roller 22 and the first sorting roller 24 remains substantially constant, regardless of the adjustment and spacing between the sorting rollers 24.

More particularly, the plurality of sorting rollers 24 has an upstream end 62 which is positioned adjacent to and linked with a downstream end 64 of the plurality of conveying rollers 22. In the illustrated embodiment, an upstream sorting roller 66 positioned at the upstream end 62 of the plurality of sorting rollers 24 is mechanically connected with a downstream conveying roller 68 positioned at the downstream end 64 of the plurality of conveying rollers 22, thereby maintaining a substantially constant spacing between the upstream sorting roller 66 and the downstream conveying roller 68. In one embodiment, the upstream sorting roller 66 can be mechanically connected with the downstream conveying roller via at least one mechanical link 70, such as a pair of mechanical links which are positioned at and connected with bearings at a respective opposite end of the upstream sorting roller 66 and bearings at the downstream conveying roller 68.

Figure 5:
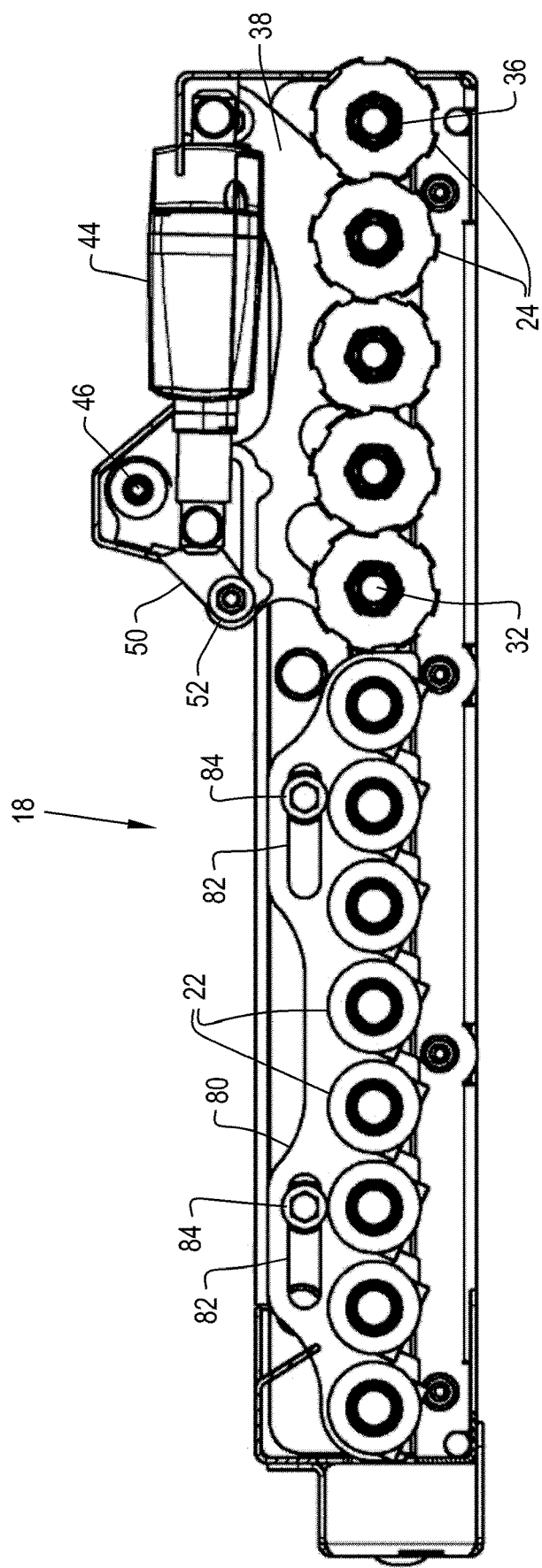
FIG. 5 is a side view of the sorting table shown in FIGS. 2-4, with the combs in a raised position.
Figure 6:
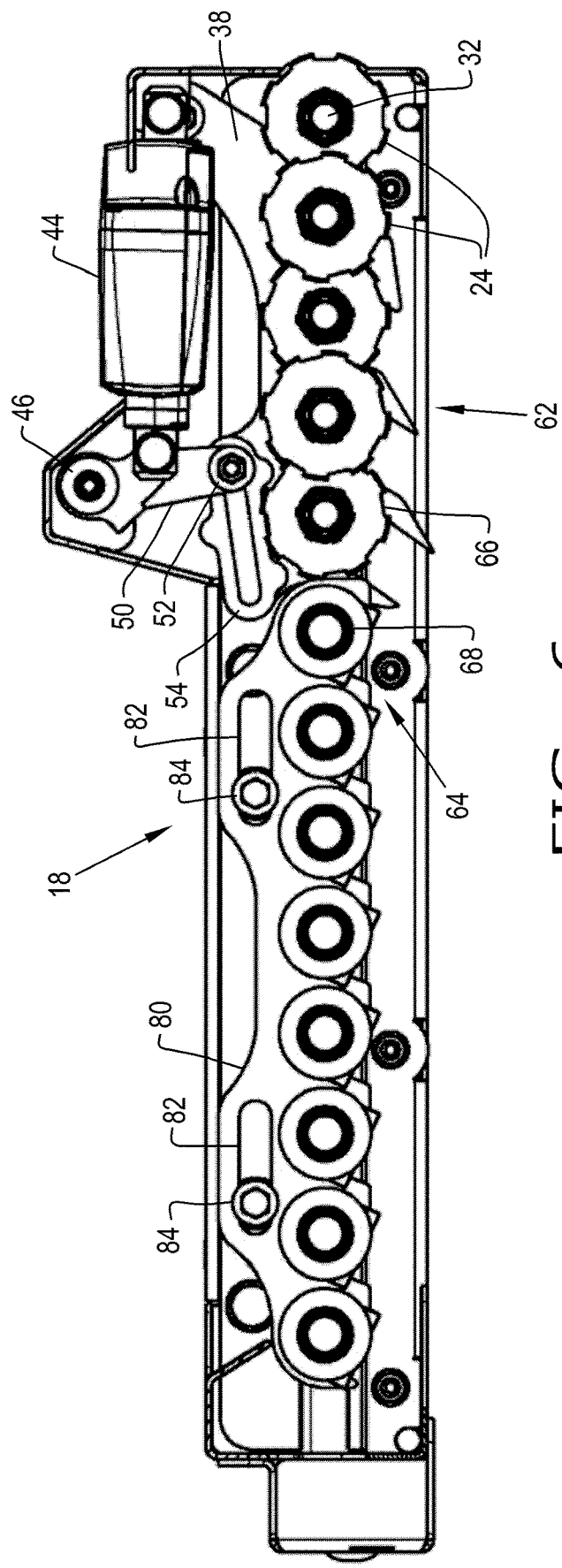
FIG. 6 is a side view of the sorting table shown in FIGS. 2-5, with the combs in a lowered position.
Figure 7:
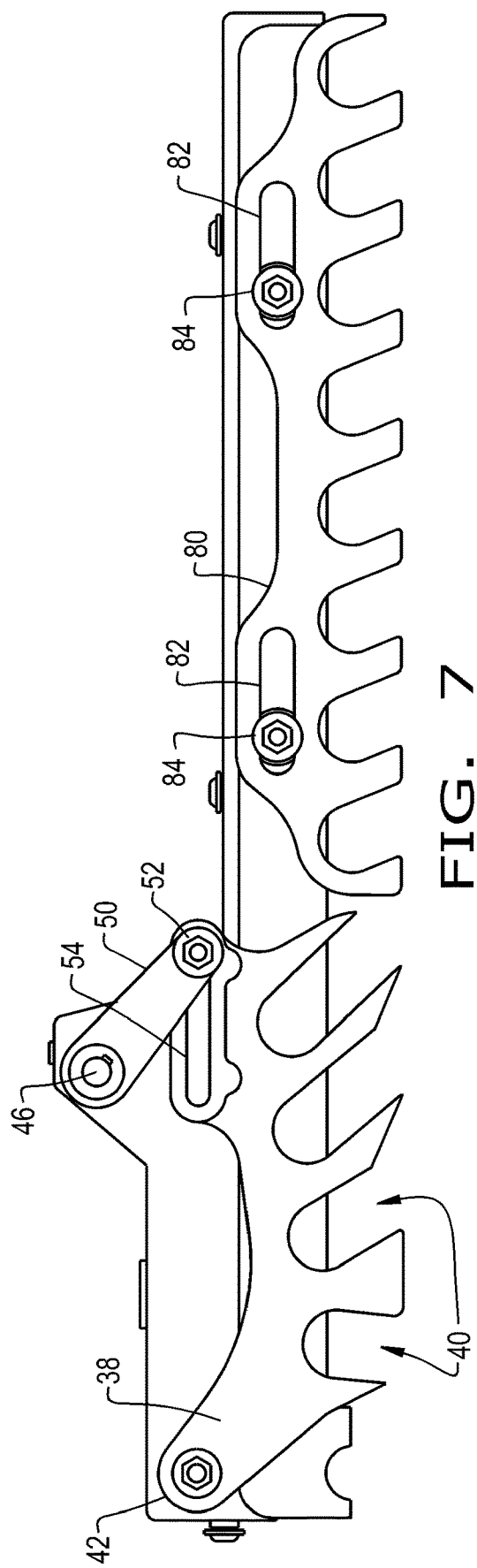
FIG. 7 is a side sectional view taken along line 7-7 in FIG. 4.
Figure 8:
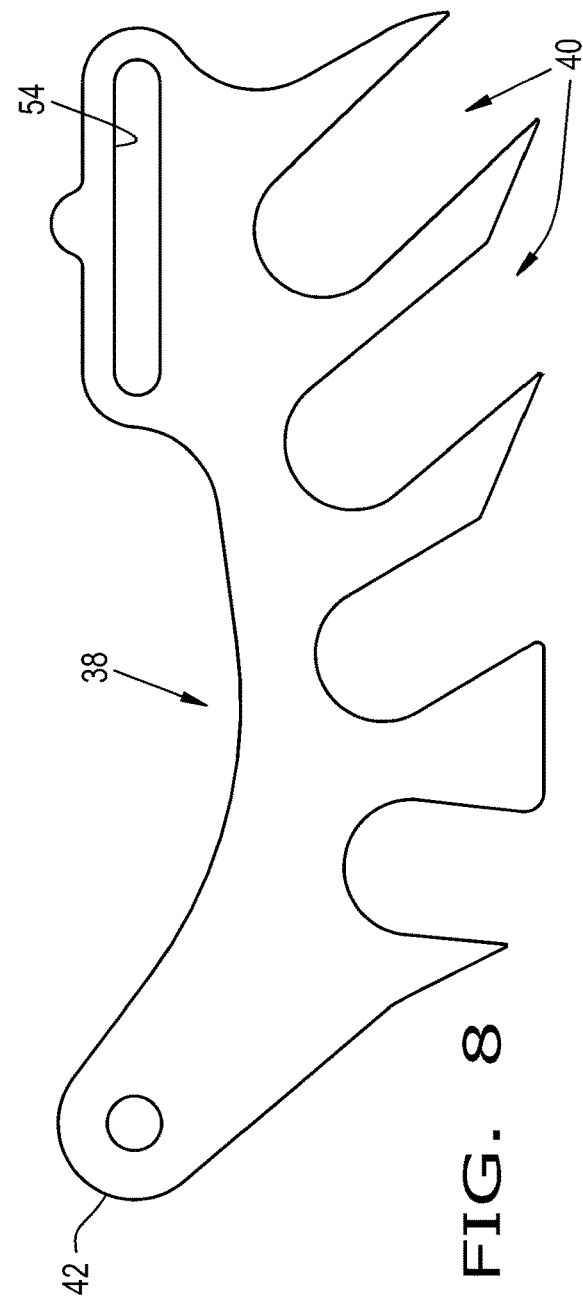
FIG. 8 is a side view of one of the combs.

In the illustrated embodiment, also the conveying rollers 22 are mounted for fore-and-aft movement relative to the frame 20. The outer ends of the conveying rollers 22 are received in bearings which are carried by guide surfaces of the side frame members 28, 30, which may be aligned with the guide surfaces for the sorting rollers 24. In order to maintain the spacing between the surfaces of the conveying rollers 22, the bearings are separated by the teeth of further combs 80 that are provided adjacent the first and second side frame members 28, 30. Each comb 80 is provided with fore-and-aft extending slots 82 for receiving a pin or bolt 84 that is affixed to the adjacent frame member 28, 30. Movement of the combs 80 over their respective bolts 84 results in a synchronized movement of all conveying rollers 22 in the same horizontal plane, in which the sorting rollers 24 can move. Meanwhile the teeth of the combs 80 ensure that the spacing between the conveying rollers 22 does not change. This may result in a variation of the distance between the upstream conveying roller 22 and the frame 20 as can be seen in FIGS. 5 and 6. The occurrence of a wider gap in this area does not have to affect the operation of the cleaning system 14 if no berries and MOG are fed to this particular section.

During operation of grape harvester 10, grapes bunches and MOG are deposited onto the conveying rollers 22 of sorting table 18. A motor and chain drive arrangement 72 simultaneously drives the conveying rollers 22 and sorting rollers 24 at a selected rotational operating speed. The chain drivingly meshes with sprockets arranged on the corresponding ends of the rollers 24, 24. An operator can input a desired spacing between the sorting rollers 24 using any suitable input device, such as a keyboard, touch screen, etc. The electrical processing circuit 56 receives the desired spacing and controls the actuator 44 accordingly to pivot the combs 38 and effect the spacing between the sorting rollers 24. Regardless of the selected spacing, the distance between the upstream sorting roller 66 and downstream conveying roller 68 remains substantially constant because of the interlink using the mechanical link 70. The ends of the downstream conveying roller 68 pull along the combs 80 and the ends of the other conveying rollers 22.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims. For instance, it is envisageable to mount the conveying rollers 22 in fixed positions and to provide the combs 38 with a pivot that is lodged in a horizontal slot. Raising or lowering the comb 38 will then result in a fore-and-aft movement of all sorting rollers 24, with the exception of the upstream sorting roller 66, which is kept in place because of its connection to the fixed downstream conveying roller 68. The movement of the first teeth roller 66 over the upstream sorting roller 66 will make the comb 38 itself move forwardly or rearwardly during its pivotal movement.

The invention claimed is:

1. A sorting table for sorting fruit in a fruit harvester, the sorting table comprising:
    a frame including a first side member and a second side member;
    a plurality of conveying rollers carried by the frame;
    a plurality of sorting rollers carried by the frame and positioned downstream from the conveying rollers, relative to a crop flow direction;
    a pair of combs, each positioned in association with the first side member or the second side member, each comb including a plurality of slots, each of the plurality of slots associated with a respective one of the plurality of sorting rollers, each of the pair of combs pivotally coupled with a corresponding one of the first side member or the second side member
    an actuator is coupled with each of the pair of combs for selectively moving the pair of combs in directions transverse to the crop flow direction; and
    an electrical processing circuit coupled with the actuator, the electrical processing circuit configured for controlling the actuator and thereby selectively increasing or decreasing a spacing between the sorting rollers.

2. The sorting table of claim 1, wherein the plurality of slots comprises slots that have distinct rearward inclinations, the rearward inclinations decreasing for slots closer to pivot point of the pair of combs.

3. The sorting table of claim 1, wherein the plurality of sorting rollers has an upstream end that is positioned adjacent to a downstream end of the plurality of conveying rollers, and the upstream end of the sorting rollers is connected to the downstream end of the conveying rollers and maintained by a connection at a fixed distance therefrom.

4. The sorting table of claim 3, wherein an upstream sorting roller positioned at the upstream end of the plurality of sorting rollers is mechanically connected with a downstream conveying roller positioned at the downstream end of the plurality of conveying rollers, thereby maintaining a substantially constant spacing between the upstream sorting roller and the downstream conveying roller.

5. The sorting table of claim 4, wherein the upstream sorting roller is connected to the downstream conveying roller by a pair of mechanical links, each of the pair of mechanical links positioned at and connected with a respective opposite end of the upstream sorting roller and the downstream conveying roller.

6. The sorting table of claim 1, wherein the plurality of conveying rollers is carried by guide surfaces provided on the first and second side frame members, allowing for movement of the plurality of conveying rollers in a fore-and-aft direction with respect to the frame.

7. The sorting table of claim 6, further comprising a distance member for maintaining spacing between the plurality of conveying rollers during the fore-and-aft movement.

8. The sorting table of claim 7, wherein the distance member comprises at least one front comb positioned in association with the first side member or the second side member each of the pair of combs including a plurality of slots, each of the plurality of slots associated with a respective one of the plurality of conveying rollers.

9. The sorting table of claim 1, further comprising an elongate member connected at opposite ends with a respective one of the pair of combs, wherein the actuator being is coupled with the elongate member to simultaneously move the pair of combs in a selected transverse direction.

10. The sorting table of claim 9, wherein the actuator comprises a powered ram connected with the elongate member, and the electrical processing circuit is further configured to selectively extend and retract the ram to thereby simultaneously move the pair of combs in the selected transverse direction.

11. The sorting table of claim 10, further comprising a lever arm connected with and extending from the elongate member, the lever arm being pivotable about an axis of the elongate member, the ram of the actuator being connected with the lever arm to pivot and thereby simultaneously move the pair of combs in the selected transverse direction.

12. The sorting table of claim 10, further comprising a pair of swing arms connected with and extending from the elongate member each of the pair of swing arms engaging a corresponding one of the pair of combs.

13. The sorting table of claim 12, wherein each of the pair of combs comprises a slot, and wherein each of the pair of swing arms comprises a distal end carrying a roller which is positioned within the slot of a corresponding one of the pair of combs.

14. The sorting table of claim 1, wherein each of the pair of combs has a trailing end which is pivotally coupled with a corresponding one of the first side member or the second side member.

15. A grape harvester comprising a sorting table, according to claim 1.

* * * * *